United States Patent
Bruns

(10) Patent No.: US 6,690,459 B2
(45) Date of Patent: Feb. 10, 2004

(54) METHOD AND APPARATUS FOR FIBER ALIGNMENT USING LIGHT LEAKED FROM CLADDING

(75) Inventor: Donald Bruns, San Diego, CA (US)

(73) Assignee: Trex Enterprises, Corp., San Diego, CA (US)

( * ) Notice: Subject to any disclaimer, the term of this patent is extended or adjusted under 35 U.S.C. 154(b) by 193 days.

(21) Appl. No.: 09/960,275

(22) Filed: Sep. 20, 2001

(65) Prior Publication Data

US 2002/0122173 A1 Sep. 5, 2002

Related U.S. Application Data

(60) Provisional application No. 60/273,461, filed on Mar. 5, 2001.

(51) Int. Cl.[7] .............................................. G01B 11/26
(52) U.S. Cl. ........................................ 356/153; 385/78
(58) Field of Search ................................ 356/153, 399, 356/400; 385/78, 90

(56) References Cited

U.S. PATENT DOCUMENTS 3,778,169 A * 12/1973 Adams ........................ 356/399
4,772,122 A *  9/1988 Kasner ................... 356/139.05
4,911,522 A *  3/1990 Iwamoto et al. .............. 385/97

* cited by examiner

Primary Examiner—Frank G. Font
Assistant Examiner—Roy M. Punnoose

(57) ABSTRACT

An apparatus and method for the alignment of a converging light beam with a fiber having a core and cladding, using light leaked from the cladding is provided. Light from an incoming light beam is leaked from the cladding and passes through a ferrule surrounding the cladding, to light sensors located adjacent the ferrule. When any sensor senses light, that sensor signals the converging light beam to move away from that sensor (and towards the core of the fiber) until no light shines on that sensor. Each sensor performs this same function until no light shines on any sensor, indicating a proper alignment of the light on the core of the optical fiber.

20 Claims, 4 Drawing Sheets

METHOD AND APPARATUS FOR FIBER ALIGNMENT USING LIGHT LEAKED FROM CLADDING

RELATED APPLICATION

This application is a continuation in part of Provisional Application Serial No: 60/273,461 entitled "Fiber Alignment Using Light Leaked from Cladding" filed Mar. 5, 2001.

FIELD OF THE INVENTION

The present invention relates generally to optical fibers. More specifically, the present invention pertains to methods of aligning optical fibers. Optical fibers incorporate a core designed to transmit light along its length, and cladding around the core along its entire length. Like the core, the cladding transmits light that strikes its end, but it does not transmit light to or from the core. The present invention is particularly, though not exclusively, useful for aligning an optical fiber with a converging light beam by using sensors that sense the amount of light leaking from the cladding into a ferrule around the fiber.

BACKGROUND OF THE INVENTION

Over the past several decades, the use of optical fibers, or fiber optics, to transmit information on a light beam have become increasingly popular. In fact, much of the information which is transmitted today is done over optical fibers. Alignment of a light beam into an optical fiber typically requires optical feedback to correct positioning of either the fiber or light beam. In some cases, particularly where single-mode (SM) fiber is used, continual monitoring of optical feedback is necessary to maintain proper alignment of the light beam with the fiber.

An object of the present invention is to provide an apparatus capable of aligning a light beam with a fiber so that the focal point of the light beam aligns with the core of the fiber, responsive to the amount of light leaking from the cladding of the fiber into a ferrule surrounding the fiber.

SUMMARY OF THE PRESENT INVENTION

When a light beam is aligned with a fiber, there is often a portion of the light beam that falls outside the core. This light, which falls into the cladding region of the fiber, may be used as an error signal. This invention removes the light from the cladding and measures the intensity of this light to determine the positional error between the fiber and the incident light beam.

Where a single beam is to be focused into a fiber, the light falling into the fiber's cladding can be used to focus the beam into the fiber, provided that the light in the cladding is removed from the cladding before the light scatters into other modes and loses its directional information. By positioning the fiber within a glass ferrule, the light may be captured and removed from the cladding without the introduction of confusing or subsequent reflections. To further minimize any reflections, the ferrule may be index-matched with the fiber.

While current methods may use the light falling into the cladding as an indication of positional error, these methods can measure only the magnitude, not the direction, of the error. In those systems, the control loop must then use a dithering technique to determine direction, slowing down the response time of any positional feedback and correction efforts.

The light beam entering a fiber is usually gaussian in profile, being generated by another fiber or from a laser. Consequently, most of the light is concentrated in the center of the beam, which is to be focused with an input lens and carefully aligned to the fiber core. In ordinary systems, any light falling into the cladding will propagate distances of perhaps a meter, undergoing many reflections and losing any information related to the positional errors between the light beam and the fiber core.

Cladding and index-matching mode strippers are currently available to remove the light from the cladding. These strippers incorporate the bending the fiber in a serpentine fashion which causes the light to leak out of the fiber. However, using these devices removes the positional error which is essential in an efficient position feedback system.

The present invention uses a large diameter, rigid fiber ferrule which is index matched to the fiber cladding so that multiple reflections do not occur. Since the light that misses the core and strikes the fiber cladding can be detected before it gets reflected, the measurement of this light can be used as an error signal in a position correction fast control loop. The light can be extracted before it undergoes multiple reflections by either using a short glass ferrule, so the light exits out the bottom, or by drilling holes into the side of the ferrule and adding a scattering center to intercept some of the light.

A main advantage of-the-present invention is that only the light beam itself is required for proper positioning on the fiber core, and any light striking the fiber cladding generates an error signal that is very well correlated with the light through the core. This error signal may be simply used to provide position feedback correction to maximize the light received by the fiber core.

An important characteristic of optical fibers addressed by the present invention is the concentricity of the fiber core with respect to the outside diameter of the fiber. Typically, the fiber core is concentric to the outside diameter within 0.5 microns; this is the required concentricity for standard connectors. Using the light leaking from the fiber cladding, the present invention achieves this degree of accuracy in the alignment of the converging light beam with the fiber core.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which:

FIG. 4 is a cross-sectional view of the second preferred embodiment of the present invention taken along line 4—4 through the ferrule, and showing the relative placement and dimensions of the core and cladding of the optical fiber, the ferrule around the fiber, four radial bores in the ferrule evenly distributed about the axis of the ferrule, and four (4) light sensors each of which faces adjacent to a different bore end at the side of the ferrule.

DETAILED DESCRIPTION

Figure 1:
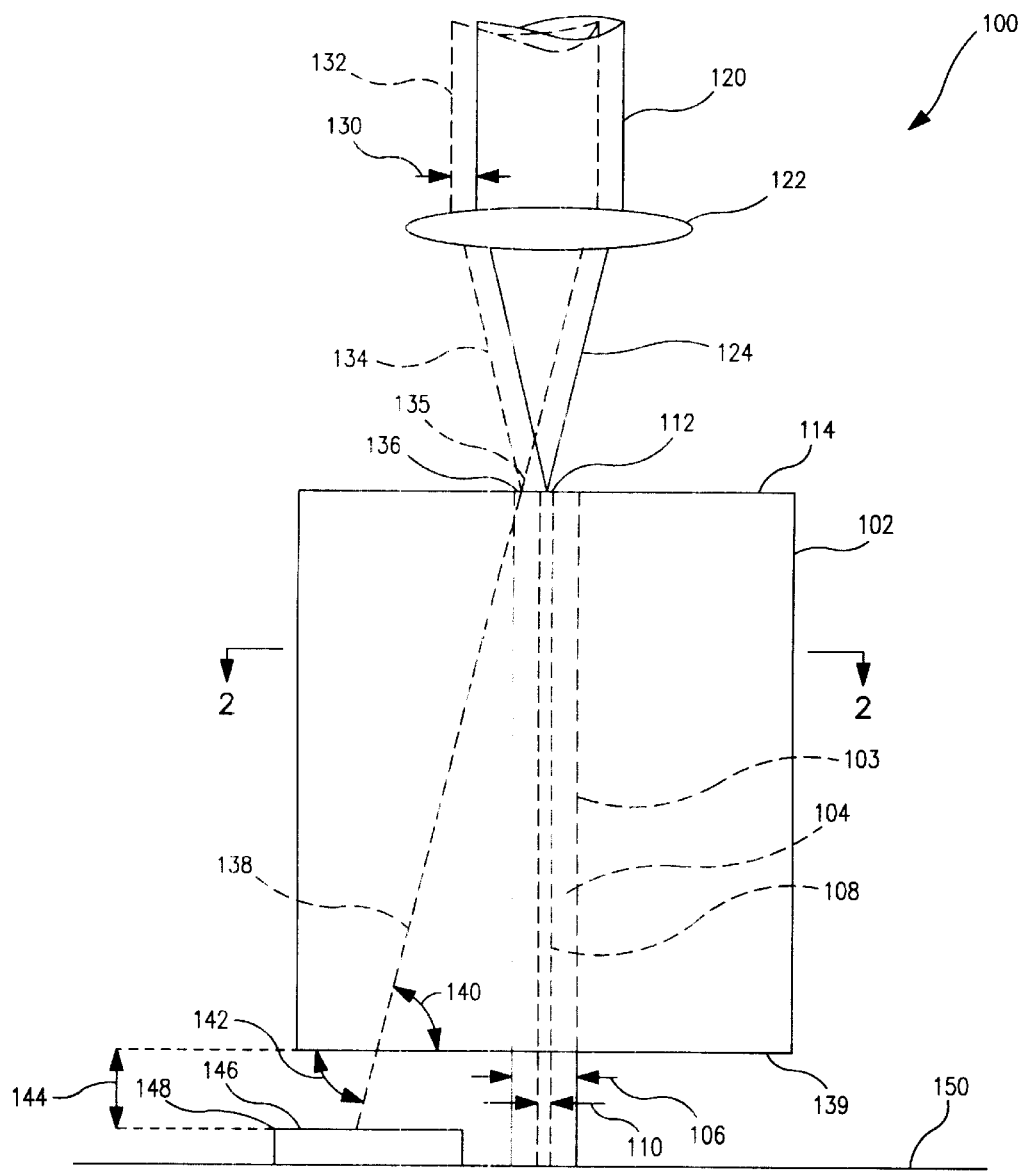
FIG. 1 is a side view of a first preferred embodiment of the present invention showing a sensor facing the ferrule end away from the light beam, a properly positioned converging light beam in relation to an optical fiber which provides an optimal optical signal into the core of the fiber, and an improperly positioned converging light beam (shown in dashed lines) which goes partly or wholly into the cladding and provides a poor or no signal.

Referring initially to FIG. 1, a side view of a first preferred embodiment of the Fiber Alignment Using Light Leaked from Cladding of the present invention is shown and generally designated 100. FIG. 1 shows an optical fiber 104, which includes core 108, cladding 107, core end 112, and cladding end 136. The core 108 and cladding 107 are often called the body of the fiber 104. The core has a diameter 110. The fiber as a whole has a diameter 106. As shown, core 108 is located in the center of and extends axially through fiber 104. The diameter 110 of core 108 can vary, depending on the type of fiber being used. For example, for a single mode (SM) fiber, diameter 110 of core 108 is approximately eight to ten microns (8–10 µm), whereas a multi-mode fiber may have a diameter 110 of core 108 approximately sixty two microns (62 µm). Regardless of whether fiber 104 is single-mode or multi-mode, the diameter 106 of fiber 104 is typically one hundred twenty five microns (125 µm). While these dimensions are typical of optical fibers, the present invention can be used with fibers and cores of any dimensions.

In FIG. 1, converging light beam 124 is properly aligned with fiber 104 such that the beam 124 focuses on the core end 112 of the fiber 104. Converging light beam 124 results from light beam 120 passing though focusing lens 122, which is shown as convex, for example. As converging beam 124 travels away from focusing lens 122, converging beam 124 becomes more concentrated into a smaller area until it reaches focal point 126. Focal point 126 of a properly positioned converging beam 124 strikes core 104 at core end 112 of fiber 104. When the focal point 126 is precisely positioned on core end 112, the light received into core 108 from light beam 120 is maximized.

Although a converging light beam 124 has been described in conjunction with the present invention, it is to be appreciated that no limitation on the present invention is intended. Rather, the present invention may be used to align an optical fiber with virtually any light source, including but not limited to converging, diverging, or collimated, light sources. Light used in this invention can include, but is not limited to, visible, infrared and ultraviolet light.

FIG. 1 also shows another light beam 132 (shown in dashed lines) offset a distance 130 from the position of light beam 120 and in an improper initial position with respect to lens 122 and fiber 104. In this position, the resulting converging beam 134 is not centered on the fiber 104 and does not allow light from beam 134 to contact core 108. Rather, the converging light beam 134 is focused at focal point 135 where a majority of the incoming light beam 134 strikes the cladding end 136 on the outside surface of fiber 104. Due to the improper position of beam 134, the light entering core 108 at core end 112 and traveling through core 108 is decreased significantly.

Light from beam 134 striking the cladding end 136 of the fiber 104 passes into and through the cladding 107 along path 138, and never enters the core 108. Thus, information in light beam 134 that does not enter core 108, may be lost. Unfortunately, this type of misalignment is a common problem in optical systems using currently available fibers.

Also, because the ambient temperature within optical equipment may fluctuate significantly, the alignment of the optical fibers may change due to the particular thermal characteristics of the fiber. As a result, the misalignment of the optical fibers presents a challenge to the manufacturing of high quality optical devices, such as optical switches, and presents a particular problem in applications where single mode (SM) fiber having a smaller core diameter is used.

The present invention incorporates a ferrule 102 around fiber 104. The ferrule 102 is a three-dimensional body somewhat larger than fiber 104 in dimension perpendicular to the axis of fiber 104. The ferrule 102 has an axial bore 103 in which fiber 104 is positioned such that core end 112 is flush with the ferrule face 114, and fiber 104 extends indefinitely in the opposite direction in axial bore 103 and past the end 139 of ferrule 102.

The core end 112 is positioned flush with the ferrule face 114 so that the light passing through cladding 107 passes from cladding 107 into ferrule 102 before the light can change direction from path 138 through cladding 107. Thus is known the direction from which the light entered cladding 107 from focal point 135 at cladding end 136.

After passing through the cladding 107, the light strikes the boundary 137 where the cladding 107 and axial bore 103 of ferrule 102 meet. The ferrule 102 is made of a light transmissive material. While the material of the ferrule 102 may have an index of refraction different than, or the same as, the cladding 107. In a preferred embodiment, the present invention incorporates a ferrule 102 having a similar index of refraction to cladding 107. For purposes of this description, ferrule 102 and cladding 107 have substantially the same index of refraction. Because the ferrule 102 and cladding 107 have the same index of refraction, the light does not change direction as it passes boundary 137 between ferrule 102 and cladding 107; rather, in the ferrule 102 the light continues in the same direction of path 138 as in the cladding 107. The light travels through the ferrule along path 138 at an angle 140 to the end 139 of the ferrule 102. The light exits end 139 of the ferrule 102 at an angle 142 to the edge of the end 139 of the ferrule 102.

It is to be appreciated that the ferrule 102 may be of any shape. The present invention is particularly useful in applications where ferrule 102 is cylindrical in shape as shown in FIGS. 1 and 2.

As FIG. 1 shows, the present invention incorporates at least one light sensor 148 affixed to a panel 150 such that the sensor face 146 substantially faces ferrule end 139 at a distance 144 from ferrule end 139. When the light exits ferrule end 139 the light travels from the ferrule end 139 to strike the face 146 of light sensor 148. The striking of the sensor face 146 by the light, indicates the direction from which the light came, and causes light sensor 148 to generate a signal passed to the control system (not shown) which causes beam 134 to move in the direction from which the light came, which is towards core end 112. Thus the focal point 135 is moved toward core end 112. This movement stops when substantially no light any longer strikes the sensor 148, which corresponds to the focal point 126 being placed at core end 112, such that most of the light now enters core 108 at core end 112 as desired.

Figure 2:
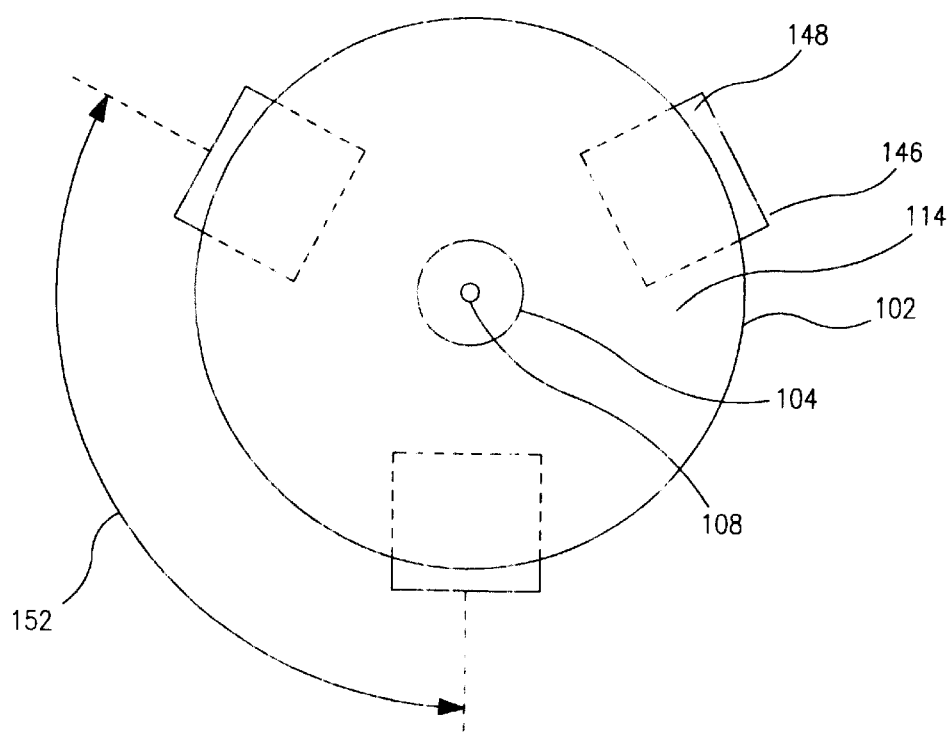
FIG. 2 is a cross-sectional view of the first preferred embodiment of the present invention taken along line 2—2 through the ferrule, and showing the relative placement and dimensions of the core and cladding of the optical fiber, the ferrule around the fiber, and three (3) sensors spaced evenly around the ferrule end away from the viewer.

FIG. 2 is a cross-sectional view of the first preferred embodiment of the present invention, which is taken along line 2—2 of FIG. 1. FIG. 2 shows the relative diameters of fiber 104 and core 108 as fiber diameter 106 and core diameter 110 respectively. As shown, core 108 is located in the center of and extends axially through fiber 104. FIG. 2 also shows three sensors 148 substantially facing ferrule end 139. Each sensor 148 is separated from each of the other proximate sensors 148 by approximately an angle 152 about axial bore 103. While FIG. 2 shows three sensors 148, it is to be appreciated that the present invention can incorporate any number of sensors 148 substantially facing ferrule end 139.

Figure 3:
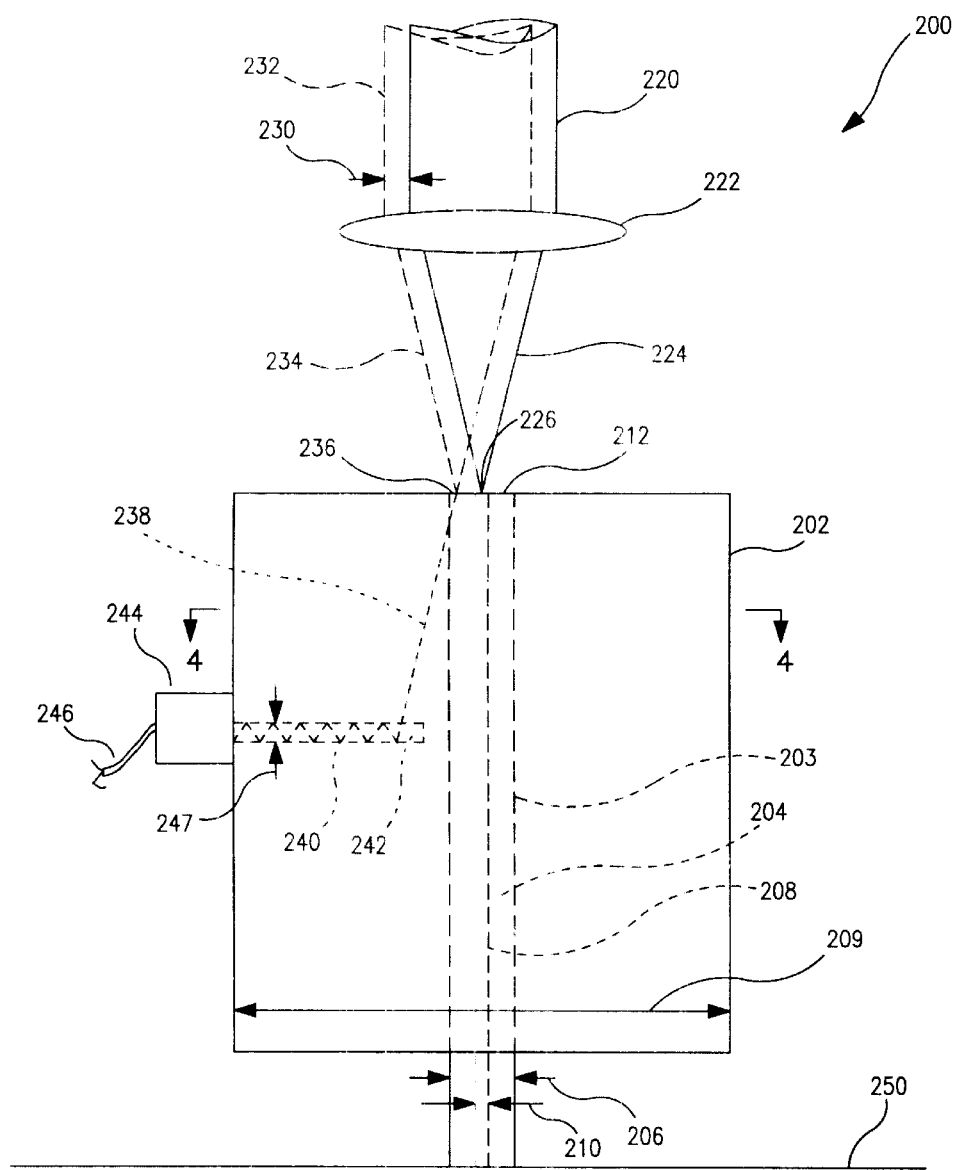
FIG. 3 is a side view of a second preferred embodiment of the present invention showing the ferrule formed with a radial bore containing a light-scattering medium, and having a sensor which faces each bore end at the side of the ferrule to receive the scattered light.

FIG. 3 is a side view of an alternative preferred embodiment of the present invention generally designated 200. FIG. 3 shows ferrule 202 formed with three(3) radial bores 240, which extend from the outside of ferrule 202 to a distance 254 from axial bore 203, and contains a light-scattering medium 242. A light sensor 244 having a sensor face 248 is placed substantially facing and proximate to the end of radial bore 240 at the outside of ferrule 202. Sensor 244 receives any light from bore 240, and provides a sensor output 246.

In FIG. 3, light from converging beam 224 is properly aligned with fiber 204. Focal point 226 of converging beam 224 contacts core 208 at core end 212, resulting in substantially all of the light from beam 224 traveling into and through core 208.

FIG. 3 also shows converging beam 234 which is improperly aligned with fiber 204. Due to the misalignment of converging beam 234 with core end 212, focal point 236 of converging beam 234 hits cladding 207 of fiber 204 at cladding end 236, resulting in a lack of light traveling into and through core 208. The light that hits cladding 207 at cladding end 236, travels along escaped light path 238 through cladding 207, through ferrule 202, and into radial bore 240.

The radial bores 240 of the present invention may contain a light-scattering medium 242. The presence of such medium causes most of the light entering radial bore 240 to reflect within radial bore 240 until the light strikes sensor face 248 of sensor 244. In a preferred embodiment, the diameter 247 of bore 240 is approximately 200 microns (200μ), and may include a light-scattering medium 242 such as the inner surface of the bore being coated with silver or aluminum, or may include glass beads 243, paint, or light-scattering flakes. However, it is to be appreciated that radial bore 240 may also contain any other light transmissive medium, or no medium at all.

When the light strikes sensor face 248, sensor 244 outputs a signal indicating the presence of the light, on sensor output 246. Substantially all the light in radial bore 240 must have come from the direction away from sensor 244 and towards axial bore 203. Therefore, it is known from which direction the light came. The signal from sensor output 246 is provided to a control system which causes the converging beam 234 to move in the direction from which the light came, towards core end 212, to the position of beam 224. This adjusted position places the focal point 226 of the converging beam 224 at the location of the core end 212. In the new, adjusted position, substantially all the light of beam 124 enters core 208 of fiber 204 at core end 212; and substantially no light passes through cladding 207, through ferrule 202, through radial bore 240, to strike sensor 244. Thus sensor 244 no longer outputs a signal on output 246 indicating the presence of light, and the movement caused by sensor 244 stops.

While distance 254 shown in FIG. 3 can be any distance from axial bore 203 to the outside of ferrule 202, the present invention is most sensitive if the distance 254 is minimized and bore 240 approaches axial bore 103. While the radial bore 240 may be positioned anywhere along the length of the ferrule 202, the invention will probably work best if the radial bore 240 is placed at about the middle of the length of ferrule 202. Radial bore 240 may be of any width up to the length or width of ferrule 202, and a preferred embodiment includes the width of the radial bore 240 being no wider than the sensor face 248, so that substantially all the light that enters radial bore 240, strikes sensor face 248, thus producing optimal output on sensor output 246. This bore may be formed in a typical ferrule with a laser drill.

Figure 4:
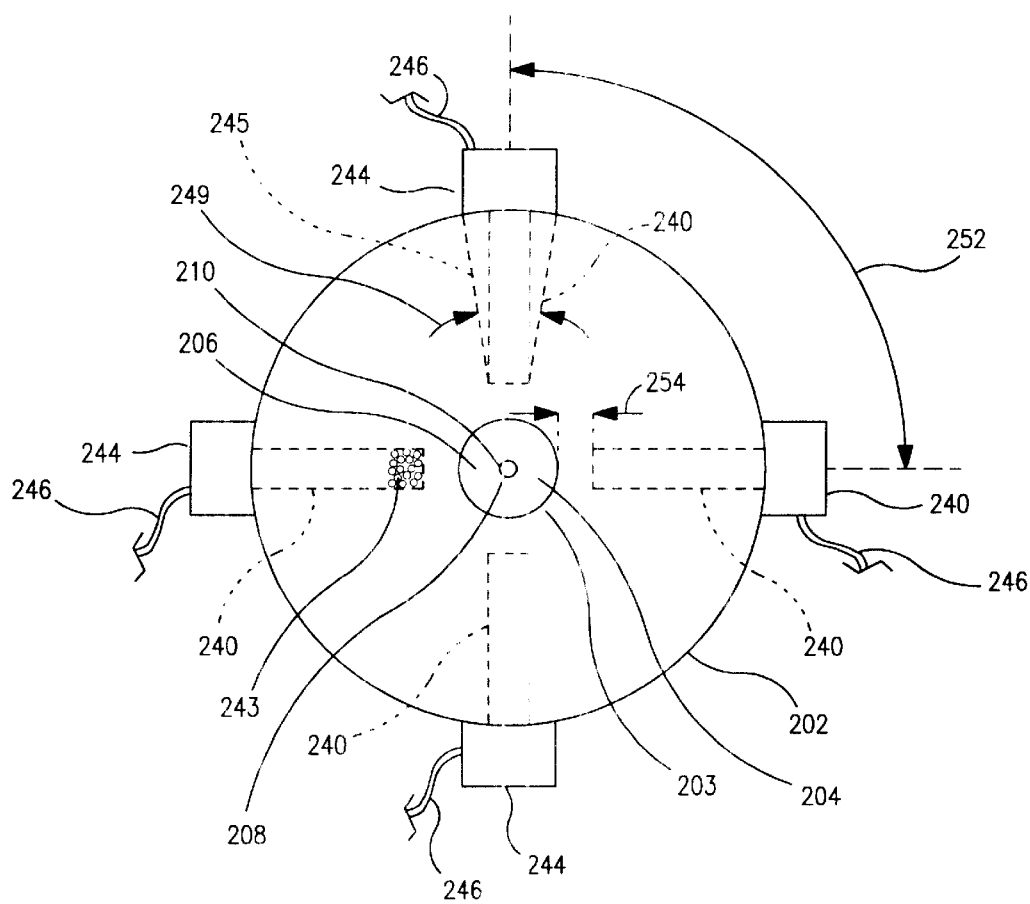

FIG. 4 is a cross-sectional view of the second preferred embodiment of the present invention, taken along line 4—4 in FIG. 3. FIG. 4 shows the relative diameters of fiber 204 and core 208. Specifically, as shown, core 208 has a diameter 210 and is located in the center of, and extends axially through, fiber 204 having a diameter 206. Diameter 209 of ferrule 202 may vary depending on the particular ferrule used. Typically, ferrule 202 may have standard diameters of 1.0, 1.25, 1.8, or 2.5 millimeters.

FIG. 4 also shows ferrule 202 formed with four (4) radial bores 240. Each radial bore 240 is separated from each of the other proximate radial bores 240 by approximately an angle 252 about axial bore 203. While FIG. 4 shows four radial bores 240, it is to be appreciated that the present invention can incorporate any number of radial bores 240, with at least one sensor 244 for each radial bore 240.

Radial bore 240 may be of any shape allowed by the dimensions of the ferrule 202, a preferred embodiment of the present invention includes a radial bore 240 cylindrical in shape. Alternatively, radial bore 204 may be tapered, as shown by dashed lines 245, having a taper angle 249. While four (4) tapered bores are shown in FIG. 4, the present invention contemplates any number of bores. For example, taper angle 249 could equal twenty (20) degrees, and a polar array of ten (10) bores 240 and sensors 244 may be included without departing from the present invention.

For clarity of the discussion, the present invention has been discussed in conjunction with a converging light beam 234 striking a particular spot on cladding end 236 of fiber 204. However, it is to be appreciated that the present invention operates to adjust the position of a light beam in at least one dimension, thereby providing a solution to problems in optical systems where an optical fiber must be aligned with an incoming light source, such as converging light beam 224. It is fully contemplated that the present invention may be applied to position a light beam in two dimensions relative to the fiber core.

Referring back to FIG. 1, the position of beam 120 is often controlled by a fiber optic switching system, such as the Optical Cross Connect Switch disclosed in co-pending utility patent application Ser. No. 09/846,879 filed Apr. 30, 2001, and fully incorporated herein by this reference. In a system which includes the present invention in conjunction with an optical cross connect switch, the signals generated from the sensors may be used to make corrections to the position of light beam 120, thereby minimizing any loss of light signal in such an optical cross connect switch.

While the methods and apparatus for the fiber alignment of the present invention as herein shown and disclosed in detail is fully capable of obtaining the objects and providing the advantages herein before stated, it is to be understood that it is merely illustrative of preferred embodiments of the invention and that no limitations are intended to the details of the method, construction or design herein shown other than as described in the appended claims.

I claim:

1. An apparatus for detecting the alignment of a light beam with an optical fiber, comprising:

a ferrule having a light-transmissive body having a face and formed with a bore extending from said face axially through said light-transmissive body, said ferrule having an outside surface;

an optical fiber comprising a light refractive cladding having a cylindrical core extending axially through said refractive cladding and having an end and an outside surface, wherein said optical fiber is closely received within said bore; and a means for detecting light passing into said ferrule.

2. The apparatus of claim 1, wherein said means for detecting light passing into said ferrule further comprises said ferrule being formed with one or more radial bores extending radially inward from said outside surface of said ferrule into said light-transmissive body of said ferrule; and one or more sensors, one sensor of said one or more sensors positioned adjacent each said radial bore and said outer surface; wherein light from said light beam enters said refractive cladding at said end and passes through said cladding into said ferrule and into said radial bore.

3. The apparatus of claim 2, wherein said radial bore contains a light-scattering medium.

4. The apparatus of claim 3, wherein said light-scattering medium is a plurality of glass beads.

5. The apparatus of claim 3, wherein said light-scattering medium is a light-scattering flake.

6. The apparatus of claim 3, wherein said bore has a surface, and said light-scattering medium is a silvering on said surface.

7. The apparatus of claim 3, wherein said light-scattering medium is an aluminum oxide.

8. The apparatus of claim 1, wherein said ferrule has a first index of refraction and said cladding has a second index of refraction, and wherein said first index of refraction is approximately equal to said second index of refraction.

9. The apparatus of claim 1, wherein said ferrule is formed with an end opposite said face, and said means for detecting light passing into said ferrule further comprises one or more light sensitive sensors positioned adjacent said end opposite said face wherein at least a portion of said light passing into said ferrule passes through said end opposite said face for detection by said sensors.

10. The apparatus of claim 9 wherein said end opposite said face is substantially planar and substantially perpendicular to said axial bore.

11. An apparatus for detecting the alignment of a light beam with an optical fiber having a refractive cladding, comprising:

a ferrule having a light-transmissive body having a face and formed with a bore extending from said face axially through said light-transmissive body and sized to closely receive an optical fiber within said bore, said ferrule having an outside surface and formed with one or more detector bores extending inward from said outside surface of said ferrule into said light-transmissive body of said ferrule; and one or more sensors, one sensor of said one or more sensors positioned adjacent each said detector bore and said outer surface.

12. The apparatus of claim 11, wherein said detector bores extend radially inward from said outside surface, wherein light from said light beam enters said refractive cladding at said end and passes through said cladding into said ferrule and into said radial bore.

13. The apparatus of claim 12, wherein said detector bore contains a light-scattering medium.

14. The apparatus of claim 11, wherein said wherein said ferrule has a first index of refraction and said cladding has a second index of refraction, and wherein said first index of refraction is approximately equal to said second index of refraction.

15. The apparatus of claim 11, further comprising a light scattering medium within said detector bore.

16. The apparatus of claim 15, wherein said light-scattering medium is a plurality of glass beads.

17. The apparatus of claim 15, wherein said light-scattering medium is a light-scattering flake.

18. The apparatus of claim 15, wherein said bore has a surface, and said light-scattering medium is a silvering on said surface.

19. The apparatus of claim 15, wherein said light-scattering medium is an aluminum oxide.

20. An apparatus for detecting the alignment of a light beam with an optical fiber having a refractive cladding, comprising:

a ferrule having a light-transmissive body having a face and formed with a bore extending from said face axially through said light-transmissive body to an end opposite said face, said ferrule having an outside surface and formed with one or more detector bores extending into said body from said end opposite said face of said ferrule; and one or more sensors, one sensor of said one or more sensors positioned adjacent each said detector bore and said outer surface.

* * * * *